United States Patent [19]
Porter

[11] 4,189,008
[45] Feb. 19, 1980

[54] AGRICULTURAL MACHINE WITH DETACHABLE AND SEPARATELY USABLE PROPELLING STRUCTURE

[75] Inventor: Frederick C. Porter, Auckland, New Zealand

[73] Assignee: Mason & Porter, Limited, Auckland, New Zealand

[21] Appl. No.: 857,620

[22] Filed: Dec. 5, 1977

[30] Foreign Application Priority Data

Dec. 13, 1976 [NZ] New Zealand .................. 182874

[51] Int. Cl.² ............................................. A01B 3/58
[52] U.S. Cl. ................................. 172/253; 172/256
[58] Field of Search ............... 172/42, 43, 256, 250, 172/251, 253

[56] References Cited

U.S. PATENT DOCUMENTS

| 349,403 | 9/1886 | Oliver | 172/42 |
| 1,224,975 | 5/1917 | Swanson | 172/42 |
| 1,754,617 | 4/1930 | Esch et al. | 172/256 |
| 3,040,590 | 6/1962 | Smithburn | 172/42 X |
| 3,123,149 | 3/1964 | White | 172/42 |

FOREIGN PATENT DOCUMENTS

540204 8/1955 Belgium .................. 172/42

*Primary Examiner*—Richard T. Stouffer
*Attorney, Agent, or Firm*—Holman & Stern

[57] ABSTRACT

An agricultural machine which comprises a frame carrying a mounting for agricultural implements such as a plow together with a handle for steering and controlling the machine with at least one axle on the frame. Wheels are provided on the axle whereby the frame may be run over the ground and a last part of a kinematic chain is arranged to drive the wheels. Also provided are rotary hoe propelling mechanism including an engine, a clutch and a gearbox which drive a shaft, the clutch gearbox and the shaft form a first part of the kinematic chain and a mounting for the rotary hoe propelling mechanism is arranged so that a second part of the kinematic chain is driven by the first part and will engage with the last part of the kinematic chain so that the engine drives the wheels. The rotary hoe propelling mechanism is readily detachable so that the rotary hoe propelling mechanism is usable separately for rotary hoeing and the rotary hoe propelling mechanism is readily mounted on the frame to complete the agricultural machine.

1 Claim, 3 Drawing Figures

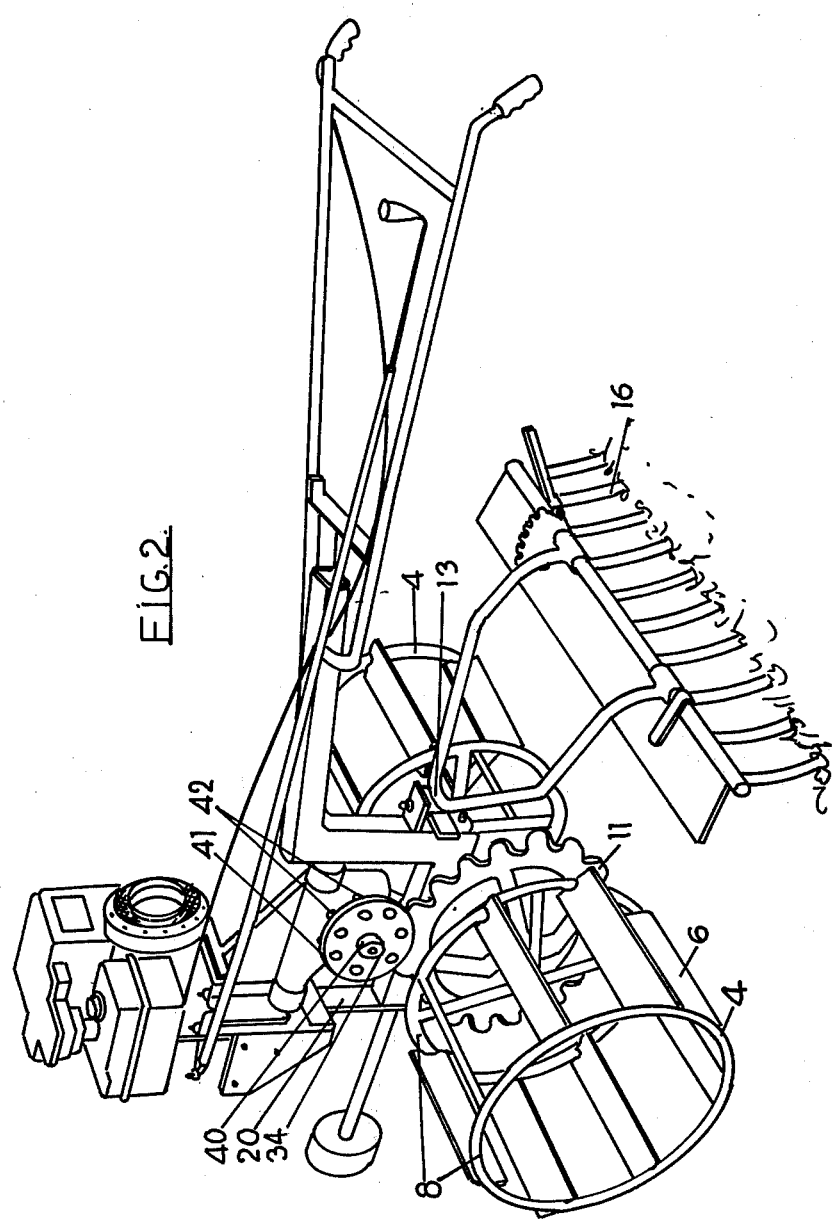

AGRICULTURAL MACHINE WITH DETACHABLE AND SEPARATELY USABLE PROPELLING STRUCTURE

This invention relates to agricultural machines.

It is an object of the present invention to provide an agricultural machine which will at least provide the public with a useful choice.

Accordingly the invention consists in an agricultural machine comprising a frame carrying a drawbar and/or mounting means for agricultural implements such as a plow; handle means for steering and controlling the machine; at least one axle on said frame; wheels on said axle whereby the frame may be run over the ground; a last part of a kinematic chain arranged to drive said wheels; rotary hoe propelling means on said frame, said rotary hoe propelling means including an engine, a clutch and a gearbox driving a shaft; said clutch, gearbox and shaft forming a first part of said kinematic chain; and a mounting for said rotary hoe propelling means arranged so that a second part of said kinemtic chain is driven by said first part and will engage said last part of said kinematic chain so that said engine in use drives said wheels, said rotary hoe propelling means being readily detachable so that the rotary hoe propelling means is usable separately for rotary hoeing, such rotary hoe propelling means being readily mounted on said frame to complete said agricultural machine.

To those skilled in the art to which this invention relates many changes in construction and widely differing embodiments and applications of the invention will suggest themselves without departing from the scope of the invention as defined in the appended claims. The disclosures and the description herein are purely illustrative and are not intended to be in any sense limiting.

One preferred form of the invention will now be described with reference to the accompanying drawings in which:

FIG. 2 is a three quarter rear view of the machine shown in FIG. 1 but with different wheels and tilling tool, and, FIG. 3 is a perspective view of a rotary hoe for incorporation in the invention shown in FIGS. 1 and 2.

Figure 3:
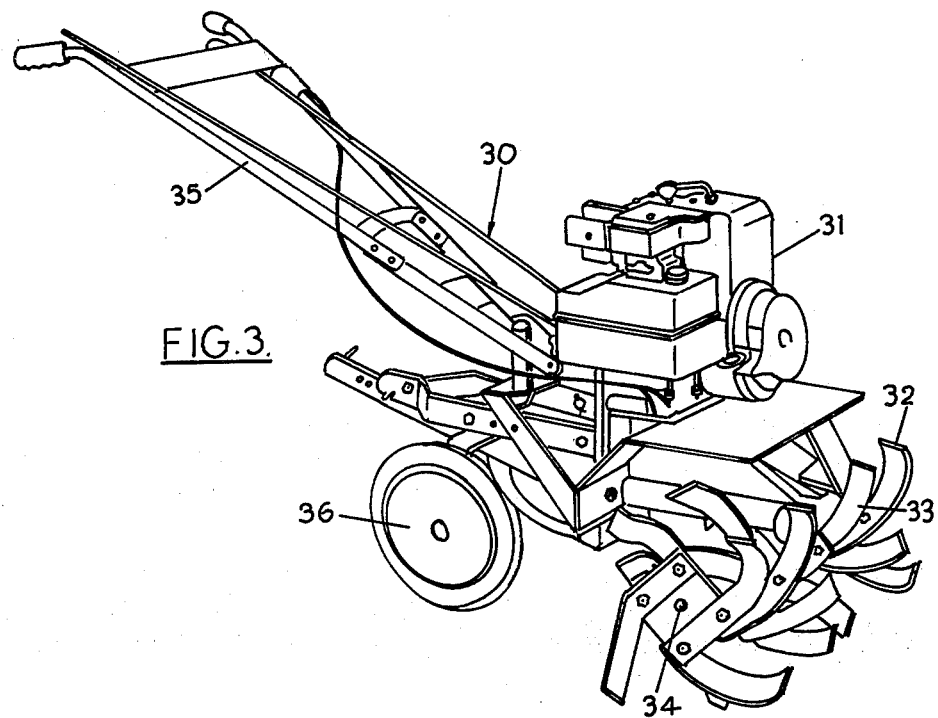

In the preferred form of the invention an agricultural machine is provided which has been devised particularly though not solely for use in cultivating rice paddy fields. The requirements of such a machine are several. The machine must be light enough so that it may be either transported under its own power from paddy field to paddy field which may in some circumstances necessitate climbing the machine over banks between adjacent paddy fields, or may be conveniently taken apart so that sections can be separately man handled for rapid reassembly at a new position. The machine must have adequate power as to enable plowing and other agricultural operations to be carried on whether the conditions are wet or dry and, of course, in a paddy field a wet condition implies being under water or substantially so. Additionally, the machine must be simple and rugged so that it can be operated and maintained by people with little technological training.

According to the present invention therefore these requirements are met in an agricultural machine constructed as follows.

A frame 1 is made of any convenient shape and this frame carries at least one axle 2, the axle or each axle in turn carrying a pair of wheels 3 or 4. The wheels 3 and 4 comprise a series of longitudinal slats or plates 5 or 6 arranged with the longitudinal axes thereof on a cylinder but the slats being tilted relative to that cylinder so that the leading edge of each slat is inside the circle and the trailing edge of each slat is outside the circle, leading and trailing being looked at from the point of view of forward motion of the frame in use. The slats or plates 5 are slats about 300 mm long in both types of wheel, the second type of wheel being larger in diameter for example about 600 mm circle diameter as opposed to about 450 mm in the longer type. The frame of each wheel 4 is made of two rings 8 of tubular material; the frame of each wheel 3 is made of one ring 9 with the slats braced thereto with suitable braces 10.

The axle 2 is driven by a gear wheel 11 which is preferably of large diameter, for example, about 400 mm pitch circle diameter with gear teeth to suit. In operation in a rice paddy field a fair proportion of this gear wheel is likely to be in wet earth or mud and consequently a robust construction is desirable. The alternative would be to provide a cover but it is thought that the expense and difficulty in maintaining this cover clear of water and mud is not warranted.

The frame also carries a drawbar or mounting 13 for agricultural implements and, for example, a proprietary reversible plow 14 may be attached by a suitable mounting to the mounting 13 with a "T" crosspiece carrying adjustable studs 15 so that swinging on the drawbar pin (which is arranged vertically) is limited by the adjustable studs contacting a part of the frame. Similarly, in FIG. 2, the mounting 13 carries a rake 16 or a disc plow or ridgers or a moulder or other type of agricultural cultivating implement is similarly attached to the frame 1. The frame also carries a pair of handles 17 whereby the operator drives or controls the machine in operation as will be described further later.

Figure 1:
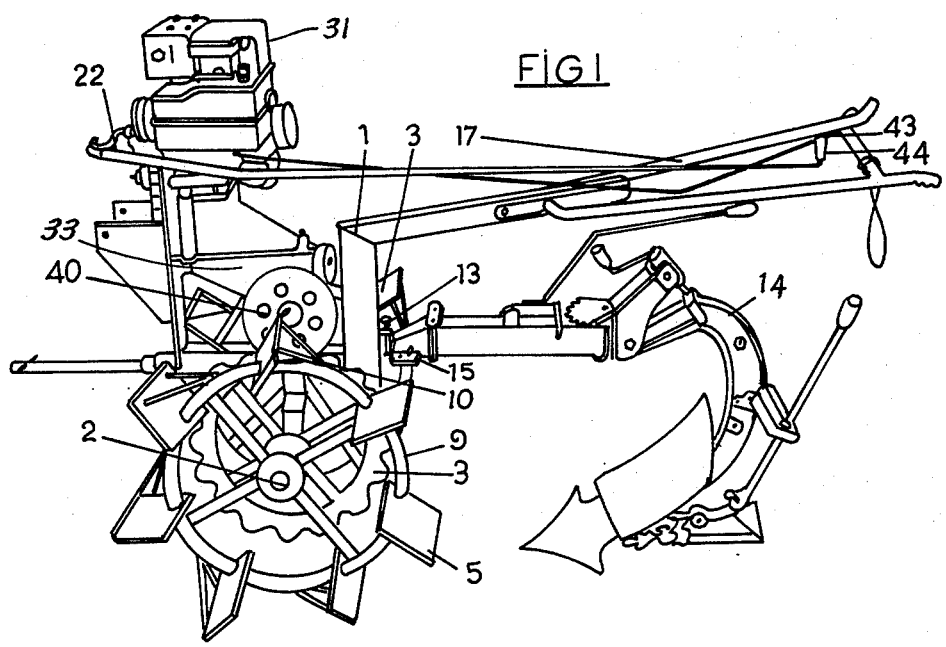
FIG. 1 is a side view of an agricultural machine according to the invention.

The frame 1 carries mountings including a Tee member 20 whereby a rotary hoe propelling means 22 is mounted on the frame 1 at a high level relative to the ground, for example, at a height of about 600–800 mm above ground level. The rotary hoe propelling means is preferably part of a a commercially available machine such as a Masport Rotahoe 30 shown in FIG. 3 either with a normal engine or alternatively with a larger engine such as a 6 kilowatt engine and, as is normal with such rotary hoes of the simple type, the engine 31 drives rotating tines 32 through a Vee belt or centrifugal clutch and suitable gear box such as a worm wheel gear box 33, the tines being mounted on a shaft 34 running transversely of the rotary hoe. The clutch gear box and shaft form a first part of a kinematic chain. Handle 35 and mounting wheels 36 are provided in the known way. To attach the rotary hoe propelling means 22 to the machine frame, suitable means of attaching including the tee member 20 are provided, being for example, slotted holes through which studs are passed into screwed holes in mounting plates on the machine frame or otherwise as desired. The shaft 34 on which the rotary tines 32 are mounted for rotary hoe activity is arranged when the rotary hoe propelling means is mounted on the machine frame so that a pinion wheel 40 forming a second part of the kinematic chain is mounted on the rotary hoe shaft either in place of one of the rotary hoe tine wheels or beside such wheels (the first being preferable) such pinion then engaging with the teeth of the gear wheel 11 mounted on the axle, the gear wheel and axle forming a last part of the kinematic chain. The pinion may be a lantern wheel pinion or part thereof, for example, a single disc 41 carrying spaced rods 42 on one side thereof or may be a pinion wheel having normally cut gear teeth as desired. Other kinematic chains may be used. With such a gear transmission it will be apparent that the machine will move in a direction opposite to that in which the rotary hoe is normally moved so that the rotary hoe propelling means is, in effect, mounted backwards on the machine. This has an advantage in that although shown stripped in FIGS. 1 and 2, only a minimum of stripping of the rotary hoe propelling means is necessary when mounting it in position since the handles, mounting wheels and other accessories on the rotary hoe may be left on the rotary hoe propelling means when mounting it on the machine. However, for convenience, the throttle and clutch controls for connecting and disconnecting the rotary engine from the rotary tines are preferably replaced by, for example, Bowden cable throttle control 43 and rod type clutch control 44.

The use of the machine will be obvious. When it is required to use the machine, the rotary hoe propelling means is mounted on the machine frame, preferably detaching both rotary hoe tine wheels as a matter of safety and replacing one of them with the pinion wheel so as to engage the gear wheel on the axle. The means for connecting and disconnecting the rotary hoe engine with the rotary hoe shaft and the throttle control are transferred to the handles of the machine and preferably the handles, mounting wheels and other accessories of the rotary hoe are removed. The machine is then ready for operation to enable it to act as a tractor for pulling any type of agricultural implement including, for that matter, a trailer or other device requiring slow speeds but increased power applied to the wheels.

The preferred form of the construction has many advantages, in particular, the advantages of simplicity, relative lightness, low cost because two machines are provided, quick changeover from one machine to the other and the major advantage that because the rotary hoe propelling means is kept relatively high, the high speed parts of the machine are kept well away from the ground being worked which, as stated, may well be in a very wet and muddy condition.

I claim:
1. In combination a wheeled frame and rotary hoe propelling means, the combination forming an agricultural machine,
   said propelling means comprising an engine, a clutch, a gearbox, and a shaft, said engine driving said gearbox through said clutch, said gearbox driving said shaft;
   said wheeled frame comprising mounting means for agricultural implements such as a plow, handle means on the frame for steering and controlling the combination, throttle and clutch control means on said handle means detachably connected to said engine and said clutch respectively, at least one axle rotatably mounted on said frame, ground wheels on said at least one axle whereby the frame may be run over the ground, a toothed wheel on said at least one axle operatively connected to drive said ground wheels, a mounting for said propelling means arranged so that said propelling means are readily detachably mounted on said frame at a high level relative to the ground, and a pinion wheel detachably mountable on said shaft, drivably engaging said toothed wheel, said pinion wheel and toothed wheel being sized to drive said ground wheels at a substantially reduced speed relative to the shaft speed;
   said propelling means being readily detachable as a complete assembly so that said rotary hoe propelling means is usable separately for rotary hoeing, said propelling means being readily mounted on said wheeled frame to complete said agricultural machine.

* * * * *